United States Patent [19]

Schaefer et al.

[11] 3,948,799

[45] Apr. 6, 1976

[54] PROCESS FOR PREPARING SILICA ORGANOSOLS

[75] Inventors: David P. Schaefer, Hinsdale; Linda J. Pluta, North Riverside, both of Ill.

[73] Assignee: Nalco Chemical Company, Oak Brook, Ill.

[22] Filed: Sept. 28, 1973

[21] Appl. No.: 401,772

[52] U.S. Cl............................... 252/309; 106/287 S
[51] Int. Cl.²........................................... B01J 13/00
[58] Field of Search .................. 252/309; 106/287 S

[56] References Cited
UNITED STATES PATENTS 3,351,561 11/1967 Albrecht et al..................... 252/309
3,440,174 4/1969 Albrecht......................... 252/309 X
3,660,302 5/1972 Winyall............................. 252/309

*Primary Examiner*—Richard D. Lovering
*Attorney, Agent, or Firm*—John G. Premo; Robert A. Miller; Barry W. Sufrin

[57] ABSTRACT

Silica organosols are described which comprise hydroxy free organic solvents as the continuous phase and as the discontinuous phase which is uniformly dispersed throughout the hydroxy free organic liquid, discrete dense particles of colloidal silica having a particle size within the range of 3 – 100 mu. Also described is a method for preparing these silica sols which comprise adding hydroxy free organic solvents to commercially available aqueous silica sols and then removing the water from the mixture by distillation.

2 Claims, No Drawings

PROCESS FOR PREPARING SILICA ORGANOSOLS

INTRODUCTION AND PRIOR ART

The patent literature is replete with references showing silica organosols and their method of preparation. Illustrative of such disclosures are the following U.S. patents:

U.S. Pat. No. 2,408,654 — This patent teaches the preparation of organosols by adding low molecular weight silicic acid to certain organic solvents. The starting silicic acid solutions are relatively dilute. After the silica is added to the organic liquid, salt is added to salt out the silica into the organic phase.

U.S. Pat. No. 2,383,653 — shows a similar disclosure. Again a salting out technique is employed to displace silica into the organic liquid.

U.S. Pat. No. 2,392,667 is similar to the disclosures of the above two patents with the exception the silica is removed from the organic liquid by means of a solvent extraction technique.

In all of the above patents it should be pointed out that the starting silica sols are primarily dilute solutions of low molecular weight silicic acid. Also, while all of these patents make a general statement that when the silicic acid solutions are mixed with the organic liquids the water may be removed by distillation, specific teaching of such concentration technique is not shown. Most importantly, products of the type produced by the above patents are relatively unstable organosols which restricts commercial usefulness to situations where the sols can be freshly prepared and then used immediately thereafter.

U.S. Pat. No. 2,974,105 shows the preparation of silica organosols where the organic liquids used in preparing the sols are generically alkoxy substituted ethanols. To prepare sols of this type it is necessary to produce as a starting aqueous sol a deionized sol before the silica is in a condition to be displaced into the alkoxy substituted ethanols.

U.S. Pat. No. 3,351,561 shows the use of hydroxy free organic solvents for the treatment of silica sols during an esterification process. The hydroxy free organic solvents are used in conjunction with certain alcohols to produce what may be described as a partially esterified silica sol the particles of which sol have a portion of their surface silanol groups loosely associated with the hydroxy free organic solvents. The products described in this patent may be considered as esterified sols which are dispersed in an organic liquid. Such products should be distinguished from the compositions of this invention which comprise particles of non-esterified silica dispersed in certain hydroxy free organic solvents.

U.S. Pat. No. 3,699,049 deals with producing silica organosols wherein the silica particles are dispersed in certain water miscible alcohols. While the method for preparing these organosols is similar to the method used in preparing sols of this invention, it should be remembered that the organic media is entirely different.

INVENTION

This invention relates to silica organosols which have as their continuous phase an organic hydroxy free liquid which has a dipole moment in Debye Units greater than 3. The dispersed phase is composed of discrete dense particles of silica having an average particle size within the range of 3 – 100 mu; preferably the particle diameter is then in the range of 12 – 35 mu. The silica concentration of these organosols may vary between 10 – 60% by weight silica expressed as $SiO_2$.

The sols of the type described above contain less than 10% by weight of water and are characterized by having a shelf life at room temperature, e.g., 72+ or −3°F, greater than one year.

The general process for preparing these sols is by water displacement. Preferably the organic solvent is added to the aqueous sol as the water is simultaneously removed by distillation. An alternative is to mix the organic solvent with the aqueous sol and then remove the water by distillation. Either method may be carried out with or without the use of vacuum. The amount of hydroxy free organic liquid should be in an amount at least sufficient to produce a product of not greater than 60% $SiO_2$ after the water has been removed.

The aqueous sol used as the starting material may be either an alkaline stabilized sol or an acidic sol substantially free of alkali metal salts. The particle diameter of the colloidal silica can be in the range of 3 – 100 mu. Preferably the particle diameter is in the range of 12 – 35 mu. Concentration in the organic solvent depends on the particle size — large particle diameter sols can be made at higher concentrations. Concentrations of from 10 – 60% silica are possible for sols greater than 15 mu. TABLE I is a list of Nalcoags and their properties which are suitable for making the desired organosols.

TABLE I

| Nalcoag* | % $SiO_2$ | P.D. (mu) | pH |
|---|---|---|---|
| Nalcoag 1030 | 30 | 13 | 10.2 |
| Nalcoag 1034A | 34 | 20 | 3.2 |
| Nalcoag 1035 | 35 | 20 | 8.6 |
| Nalcoag 1140 | 40 | 15 | 9.7 |
| Nalcoag 1050 | 50 | 20 | 9.0 |

*Trademark of Nalco Chemical Company

TABLE II contains an illustrative list of organic solvents meeting the requirements stated previously. Dimethylformamide is the preferred solvent.

TABLE II

| | Dipole Moment (Debye Units) |
|---|---|
| Nitromethane | 3.1 |
| Nitroethane | 3.2 |
| Dimethylacetamide | 3.8 |
| Dimethylformamide (DMF) | 3.8 |
| N-Acetylmorpholine | 3.8 |
| γ-Butyrolactone | 4.1 |
| Propylene carbonate | 4.1 |
| Tetramethylene sulfone | 4.4 |

EXAMPLES

The following examples are representative of the products and procedure.

EXAMPLE 1

One liter of N,N-dimethylformamide was added to 1,225 ml of Nalcoag 1034A (a 20 mu, 34% acidic sol which is doubly-deionized to render it essentially salt free) while simultaneously removing the water by distillation under 25 inches of vacuum. 1,100 ml water was removed in 1½ hours. The product contained 42.6% $SiO_2$ and 5.0% $H_2O$ as determined by the Karl Fischer method.

EXAMPLE 2

Five hundred milliliters of N,N-dimethylformamide was added to 575 ml Nalcoag 1035 (a 20 mu, 35% aqueous alkaline sol containing 0.2% $Na_2O$) while simultaneously removing 475 ml water by distillation under vacuum. The final product contained 37.9% $SiO_2$.

EXAMPLE 3

To 342 ml Nalcoag 1,050 (20mu, 50% $SiO_2$) which had been passed through a strong acid cation exchange resin was added 250 ml DMF while simultaneously removing 236 ml water by distillation under 27 inches vacuum. The final product was a clear, fluid liquid containing 50.3% $SiO_2$.

EXAMPLE 4

345 ml of γ-Butyrolactone was added to 500 ml of Nalcoag 1034A while simultaneously removing 375 ml water by distillation under vacuum. The product contained 34.6% $SiO_2$.

We claim:
1. A process for preparing a silica organosol which comprises the steps of:
    A. Adding a hydroxy free organic liquid having a dipole moment in Debye Units greater than 3 to an aqueous colloidal silica sol said silica sol composed of discrete silica particles having an average particle size diameter of 3–300 m$\mu$, said sol further characterized as having a silica concentration of from 10–60% by weight silica expressed as $SiO_2$; while,
    B. Simultaneously removing water from the aqueous colloidal silica sol until the water content has been reduced to not more than 5% by weight and the amount of hydroxy free organic liquid added is an amount sufficient to produce a product of not greater than 60% $SiO_2$; and then,
    C. Recovering a silica organosol comprised of silica particles uniformly dispersed in the hydroxy free organic liquid.
2. The process of claim 1 where the hydroxy free organic liquid is dimethylformamide.

* * * * *